Figure 1:
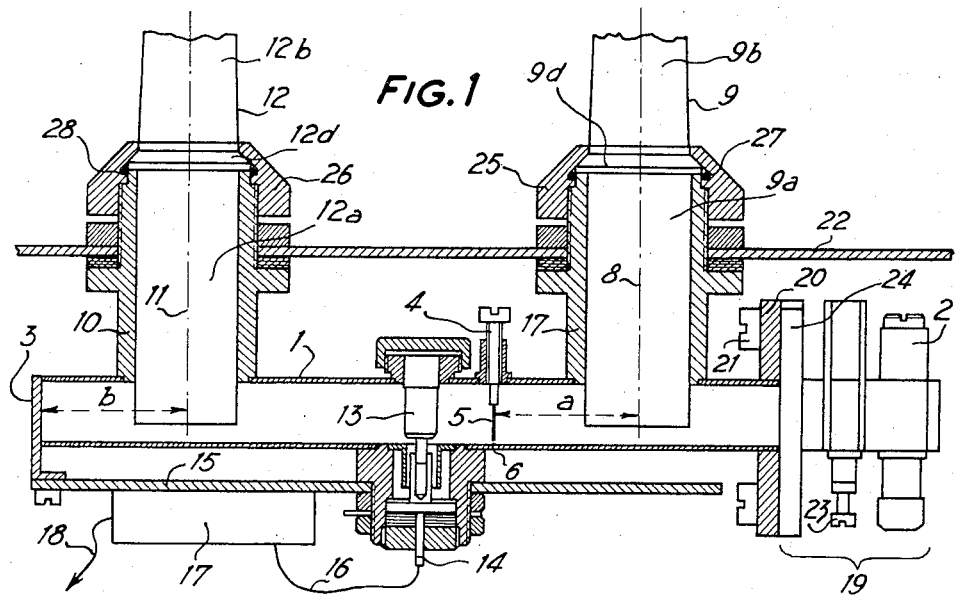

United States Patent [19]
Preti

[11] 3,806,942
[45] Apr. 23, 1974

[54] RADAR TRANSMITTER HEAD WITH TRANSMITTING AND RECEIVING DIELECTRIC ANTENNAS

[75] Inventor: Jean-Claude Preti, Paris, France

[73] Assignee: Societe De Fabrication D'Instruments De Mesure (S.F.I.M.), Massy, France

[22] Filed: Jan. 31, 1973

[21] Appl. No.: 328,289

[30] Foreign Application Priority Data
Apr. 14, 1972  France .............................. 72.13173

[52] U.S. Cl. ................................ 343/702, 343/785
[51] Int. Cl. ............................................. H01q 1/24
[58] Field of Search ................ 343/8, 702, 785, 908

[56] References Cited
UNITED STATES PATENTS
3,747,109  7/1973  Corbell et al. ...................... 343/702

Primary Examiner—Eli Lieberman
Attorney, Agent, or Firm—Donald D. Jeffrey

[57] ABSTRACT

A transmitting and receiving head for a Doppler effect radar detector comprising a rectangular waveguide into which a transmitting and a receiving aerial are coupled and which contains a crystal mixer between the two aerials, energy fed to one end of the waveguide being radiated by the transmitting aerial and passing through an obturator which allows a controlled leakage to reach the mixer for mixing with the energy delivered to the other end of the waveguide by the receiving aerial.

7 Claims, 4 Drawing Figures

RADAR TRANSMITTER HEAD WITH TRANSMITTING AND RECEIVING DIELECTRIC ANTENNAS

The present invention relates to a Doppler effect radar detector.

More precisely, it relates to a radar head including basically the transmitter, the aerial and the radar mixer circuit.

In accordance with the present invention, this transmitter head includes a rectangular wave-guide fed at one end by a micro-wave supply and terminated at its other end by a short circuit, an obturator to obturate a transverse section of the guide with a controlled leakage, a first cylindrical hollow wave-guide opening laterally into the rectangular wave-guide between the said section and the micro-wave supply, with the axis of this first cylindrical wave-guide situated at a distance from the said section equal to half the wave-length of the transmission wave inside the guide, an aerial fitted in the first cylindrical wave-guide and projecting out from it to form the transmission aerial, a second cylindrical hollow wave-guide opening laterally into the rectangular wave-guide between the said section and the short circuit, with the axis of this second cylindrical wave-guide situated at a distance from the short circuit equal to half the wave-length of the transmission wave inside the guide, an aerial fitted in this second cylindrical wave-guide and projecting out from it to form the reception aerial, a crystal mixer fitted between the said section and the said second cylindrical wave-guide to receive the reception waves and the said controlled leakage, and means of output of the signal provided by the said crystal.

A radar head of this design allows the manufacture of detectors at a reduced cost price.

Figure 2:
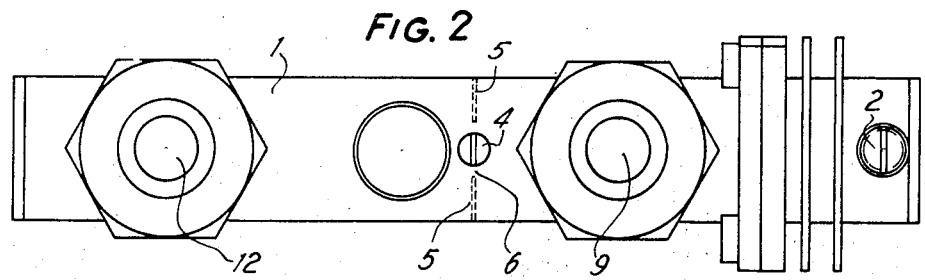
Figure 3:
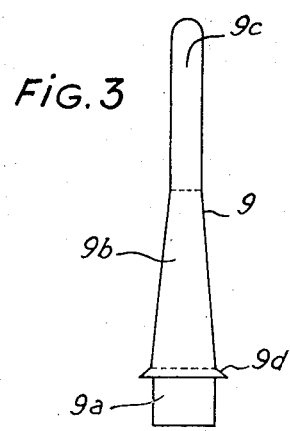
Figure 4:
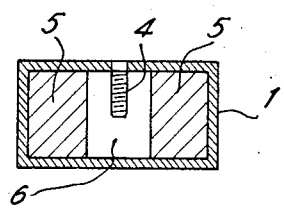

Below is described a preferred embodiment of a radar head in accordance with this invention and other characteristics will appear in the course of this description with reference to the figures of the attached drawing, in which:

FIG. 1 is a longitudinal section of the radar head,
FIG. 2 is a top view of the radar head in FIG. 1,
FIG. 3 is a view, on a reduced scale, of one of the radar aerials, and
FIG. 4 is a cross-section view of the rectangular wave-guide, including an obturator.

The radar head represented in the figures is designed to transmit in band X, for example, a frequency of 8875 GHz. This head is formed of a rectangular wave-guide 1, fitted at one end with a negative resistance transmission diode (for example, a Gunn or an avalanche diode) and terminated at its other end by a short circuit.

In the example shown, the diode 2 is part of a unit 19 which is attached to a flange 20 of the wave-guide by means of a flange 24 of the unit and a screw 21. Besides the diode 2, the unit includes a screw 23 for regulating the frequency.

Into the wave-guide 1, there opens laterally on the same surface of the wave-guide, a first cylindrical hollow wave-guide 7 and a second cylindrical hollow wave-guide 10, the axes 8 and 11 of which are parallel with one another and perpendicular to the perforated surface of the wave-guide 1. In these cylindrical hollow wave-guides there are fitted wave-guides 9 and 12 in dielectric material which are referred to later.

Between the places where the wave-guides 7 and 10 enter, the rectangular wave-guide 1 has a vertical section 6 which is partly obturated by an obturator consisting on the one hand of plates 5 and, on the other hand, of a reactive screw 4 which can be driven in at will between the plates, as can be seen better in FIG. 4.

This partial and adjustable obturation of the cross-section 6 of the wave-guide allows only a very small part of the energy supplied by the diode 2 to pass to the other side of this section; this "leakage" energy is, for example, regulated in order to have a permanent current of about 0.5mA in a crystal mixer 13 situated in the wave-guide in a known manner.

The axis 8 of the cylindrical wave-guide 7 is situated at a distance $a$ from the section 6, and the axis 11 of the cylindrical wave-guide 10 is situated at a distance $b$ from the short circuit 3; the two distances $a$ and $b$ which are equal, each correspond to half of the length of the transmission wave of the guide.

The transmission aerial 9 and the reception aerial 12 are identical and are in the form of a rod or "taper" (FIG. 3).

This taper consists of a cylindrical base $9a$ of a diameter of $0.51$ which penetrates into the rectangular wave-guide 1 in such a manner as to obtain complete coupling, a cone-shaped part $9b$, $3l$ long which connects part $9a$ to a cylindrical part $9c$, $3l$ long and $0.3l$ in diameter, $l$ representing the length of transmission waves in the air. The taper is manufactured in dielectric material, for example, Teflon.

The taper aerials 9 and 12 are held in place in the cylindrical wave-guides 7 and 10 by respective flanges $9d$ and $12d$ of the aerials which are held between the ends of the cylindrical wave-guides by nuts 25, 26; sealing is ensured to as great a degree as is necessary by means of annular seals 27, 28.

The signal available at the output 14 of the mixer 13 is transmitted to a suitable receiving device, either directly or indirectly and, in particular, through a pre-amplifier 17 which is connected to the output 14 by a lead 16 and which provides an amplified signal at its output 18.

Preferably this pre-amplifier will be designed in the form of an integrated circuit mounted on a support plate 15 connected to the wave-guide 1. It is designed so that the output signals which it provides are greater than the induced parasitic signals which could be present in the link line 18 and, for example, it multiplies a hundredfold the output power of the signal at 14. To give some indication, in the example mentioned the input resistance of the pre-amplifier is 1,000 ohms and its output resistance is 10 ohms.

The head unit is supported on a plate 22 which acts as a front cover and through which pass the cylindrical wave-guides 7 and 10; the fixing of these wave-guides on to the plate 22 is ensured by rings and counter rings.

The single block unit which forms the head and which is itself formed of a combination of different parts which can be separated from one another, is usually connected to another unit or to different units which supply the head with the electrical energy and which use the signal delivered by the pre-amplifier.

The transmitter which is the subject of the invention is especially intended to be used in installations controlling or regulating road traffic: its light weight, its small volume and the transmitting power of its aerials make it suitable for the installation of the radar head on a mast above the roadway.

I claim:

1. A radar transmitter head including the transmitter, the aerial and the radar mixer circuit characterised by the head being a single block unit formed of assembled parts including a rectangular wave-guide supplied at one end by a micro-wave supply and terminated at its other end by a short circuit, an obturator to obturate a transverse section of the guide with a controlled leakage, a first cylindrical hollow wave-guide opening laterally into the rectangular wave-guide between the said section and the micro-wave supply, with the axis of this first cylindrical wave-guide situated at a distance from the said section equal to half the wave-length of the transmission wave inside the guide, an aerial fitted in the first cylindrical wave-guide and projecting out from it to form the transmission aerial, a second cylindrical hollow wave-guide opening laterally into the rectangular wave-guide between the said section and the short circuit, with the axis of this second cylindrical wave-guide situated at a distance from the short circuit equal to half the wave-length of the transmission wave inside the guide, and aerial fitted in this second cylindrical wave-guide and projecting out from it to form the reception aerial, a crystal mixer fitted between the said section and the said second cylindrical wave-guide to receive the reception waves and the said controlled leakage, and means of output of the signal provided by the said crystal.

2. A transmitter head in accordance with claim 1 in which the said obturator comprises one or more plates which restrict the said cross-section and a reactive screw which can be driven at will into the said restricted section.

3. A transmitter head in accordance with claim 1 in which the said unit includes a pre-amplifier for the mixer output signal.

4. A transmitter head in accordance with claim 3 in which the said pre-amplifier is a printed circuit on a plate attached to the head.

5. A transmitter head in accordance with claim 1 in which aerials are of the rod type.

6. A transmitter head in accordance with claim 5 in which the aerials are solids of revolution in dielectric material.

7. A transmitter head in accordance with claim 6 in which each aerial comprises a cylindrical base, then a cone-shaped part followed by another cylindrical part.

* * * * *